United States Patent Office 2,970,102
Patented Jan. 31, 1961

2,970,102
HYDROCRACKING CATALYST AND PROCESS FOR HYDROCRACKING OF HYDROCARBONS WITH SAID CATALYST COMPOSITE

Lloyd E. Gardner, Bartlesville, Okla., assignor to Phillips Petroleum Company, a corporation of Delaware No Drawing. Filed July 3, 1958, Ser. No. 746,339

21 Claims. (Cl. 208—112)

This invention relates to a method for activating a catalyst for hydrotreating gas oils, to a process for preparing a catalyst so activated, to the catalyst activated by the process, and to a process for hydrotreating gas oils, particularly hydrocracking hydrocrackable hydrocarbons, in contact with said activated catalyst.

Hydrocracking processes are commonly employed on heavy residual or distillate oils for the production of substantial yields of low boiling unsaturated products, such as gasoline, intermediate distillates which may be utilized as domestic fuels and, to some extent, heavier cuts suitable for use as lubricants. In these hydrocracking processes, cracking and hydrogenation reactions take place simultaneously. A very effective catalyst for hydrogenation reactions, including hydrocracking reactions, is one comprising tungsten disulfide supported on alumina. Tungsten trioxide has been found not to be as effective as tungsten disulfide and, unfortunately, tungsten disulfide is converted to tungsten trioxide after repeated regenerations of the catalyst to remove coke. Although tungsten trioxide can be converted to tungsten disulfide, this conversion is not obtainable at readily available temperatures and extremely high temperatures in the range of 1200–1800° F. must be used. Therefore, tungsten disulfide has very limited usefulness for treating hydrocarbons having high coking characteristics.

I have discovered that the incorporation of a small amount of a potassium compound in a tungsten catalyst composition promotes the sulfiding or reducing reaction of tungsten trioxide to tungsten disulfide so as to permit a tungsten catalyst composition to be converted into the active tungsten disulfide form at somewhat elevated, but readily obtainable, temperatures.

It is an object of this invention to pro.iue a process for activating a tungsten catalyst at low temperature. Another object of this invention is to provide a process for preparing a tungsten hydrocracking catalyst which can be readily regenerated and resulfided. Another object of this invention is to provide an improved hydrocracking catalyst which has high cracking and desulfurization activity. Another object of this invention is to provide an improved process for the conversion of hydrocarbons to more valuable fluid hydrocarbons, particularly to hydrocracking hydrocrackable hydrocarbons.

In accordance with the invention, an improved hydrocracking catalyst is prepared by incorporating a potassium compound in intimate association with a tungsten compound on alumina, and after drying the composite formed, calcining at an elevated temperature to convert the metal compounds to metal oxides. This calcined catalyst is readily activated for effecting hydrocracking reactions, including hydrogenation reactions, by treatment with a sulfiding gas containing hydrogen at a reasonably low elevated temperature for a period of time sufficient to convert at least a portion of the tungsten trioxide into tungsten disulfide. The tungsten-potassium catalyst of this invention, after activation according to this invention, has high cracking and desulfurization activity in hydrocracking processes. Furthermore, the catalyst of this invention can be readily regenerated and resulfided so that this catalyst is extremely useful in treating hydrocarbons having high coking characteristics.

The activation treatment of this invention comprises contacting a tungsten trioxide catalyst containing potassium oxide with a sulfiding gas containing hydrogen at an elevated temperature for a period of time sufficient to effect conversion of some of the tungsten trioxide to tungsten disulfide. The sulfiding gas containing hydrogen can be any hydrogen stream containing sulfur in the range of from 2–20% by volume calculated as hydrogen sulfide; however, hydrogen streams containing more or less sulfur can also be used. Furthermore, the sulfiding gas can be a mixture of hydrogen sulfide and hydrogen and this mixture can be either synthetically prepared or separated from available hydrocarbon streams. Also, a hydrocrackable hydrocarbon stream containing sulfur to be used as a feed stream in a hydrocracking process employing the catalyst of this invention can also be used. Also, the catalyst of this invention can be activated by treatment with hydrogen sulfide alone or by treatment of the catalyst with hydrogen sulfide separately followed by treatment with hydrogen. The activation treatment of this invention is carried out at a temperature in the range of 700–1000° F. and a temperature in the range of 900–1000° F. is preferred. The time required for effecting the activation is that which is sufficient to convert at least some of the tungsten trioxide to tungsten disulfide and depends primarily upon the concentration of sulfur in the sulfiding gas. Ordinarily, a period of time at least as long as 30 minutes will be required and sometimes a period of time up to 10 hours will be used. Ordinarily, a time in the range of from 1 to 3 hours is sufficient.

The activation treatment of this invention is applicable to catalyst composites containing tungsten oxide in admixture with potassium oxide, preferably when in intimate admixture therewith, supported on a carrier or support, preferably alumina. All reasonable proportions of the catalyst components are amenable to activation by the process of this invention; however, it is preferred to use tungsten trioxide in the range of from 5 to 15.0% by weight of catalyst, calculated as the metal, potassium oxide in the range of from about 0.5 to 2.0% by weight of the catalyst, calculated as the metal, and the balance gamma alumina. Supports which are effective in the composite catalyst include various types of active alumina obtained from a number of sources. Synthetic alumina, partially dehydrated naturally occurring hydrous alumina, as well as precipitated alumina trihydrate partially dehydrated so as to maintain the alumina, at least in part, in the gamma form, may be used as the support for the other constituents of the catalyst. A preferred specific catalyst composition consists essentially of 9.68 weight percent tungsten, 0.58 weight percent potassium, and the remainder gamma alumina.

The catalyst composite which is to be activated in accordance with the activation treatment of this invention may be manufactured by any of the conventional methods utilized for preparing composite catalysts of this type. A suitable method is to impregnate prepared alumina pellets with tungstic acid ($H_2WO_4$) in a solution containing a potassium salt which is decomposable to the oxide. Potassium nitrate is the preferred potassium salt and usually the tungsten acid-potassium nitrate solution is made up in a mixture of ethanol amine and water. After impregnation, the composite is drained, dried, and calcined in air at a temperature of about 1000° F. to form the oxides of the metals.

It is also feasible to impregnate the alumina base in a variety of ways other than the method described above.

For example, the impregnation may be by successive impregnation with separate individual solutions of tungstic acid and potassium nitrate followed by calcination after each impregnation. Another variation comprises successive impregnations with separate individual solutions omitting the calcination step between the two impregnation steps. The impregnation steps can be repeated to obtain the desired concentration of the metals on the alumina support.

The novel catalysts of this invention are highly advantageous in effecting the hydrogenation and the hydrocracking of fractions amenable to hydrogenation and hydrocracking. The reaction conditions for hydrocracking reactions using the catalysts of this invention comprise a temperature in the range of from 750–875° F., a pressure in the range of from 500 to 5000 p.s.i.g., a liquid space velocity in the range of from 0.1 to 5.0 LHSV, and a hydrogen flow of 500–10,000 cubic feet per barrel of reactants.

The catalyst of this invention may be regenerated by burning off the deposited coke in an oxygen-containing atmosphere whenever the catalyst becomes inactive in use. Each regeneration of the catalyst converts some of the tungsten disulfide into less active tungsten trioxide so that the activity of the catalyst is reduced after each regeneration. The activity of the catalyst can be fully restored when activated in accordance with this invention by treatment with a sulfiding gas containing hydrogen to effect conversion of the less active tungsten trioxide into the more active tungsten disulfide.

The chemical and/or physical aspects of the catalyst of this invention after the activation treatment, which account for its increased activity for hydrocracking hydrocarbons, are unknown, but it is certain that some definite change in the character of the catalyst does occur when it is activated in a sulfur-containing hydrogen stream at elevated temperatures.

The catalyst of this invention is applicable to the treatment of any relatively heavy or high boiling liquid hydrocarbon or mixture of hydrocarbons such as a gas oil, whole crude, reduced or topped crude, coke still distillate, or tar or heavy fraction derived from the extractive or destructive hydrogenation of coal, heavy petroleum products and the like. Ordinarily, the gas oil has a boiling range of from 350° F. to 1100° F.

Potassium compounds which can be incorporated in the catalyst of this invention comprise potassium oxide or any potassium compound which is decomposable to the oxide under either calcination or catalyst regeneration conditions. Thus, potassium oxalate and potassium nitrate can be used in addition to potassium oxide.

The following specific example is presented to illustrate the invention but is not to be construed as unnecessarily limiting the same.

*Example*

Three catalysts were tested in hydrocracking a Wafra 400° F.+ crude oil at a pressure of 1000 p.s.i.g., a hydrogen flow of 2,000 cubic feet per barrel, a temperature of 850° F., and a space velocity of 1.0 LHSV. The Wafra topped crude had an API gravity at 60° F. of 18.6° API, a sulfur content of 3.6 weight percent, and a Ramsbottom carbon residue of 8.1 weight percent.

A potassium oxide-tungsten trioxide catalyst supported on alumina was prepared by adding 54.85 grams of tungstic acid ($H_2WO_4$) and 5.06 grams of potassium nitrate to 150 cc. of a 50:50 mixture of ethanol amine and water. Gamma alumina pills of 1/8 inch size were soaked in this solution for 2 hours and the excess solution filtered off before the impregnated pills were dried at 220° F., followed by drying overnight at 1000° F. in air. The surface area of this catalyst was 176 square meters per gram. The catalyst was activated by passing an hydrogen sulfide-hydrogen mixture containing 5 percent by volume of hydrogen sulfide over the catalyst at 1 atmosphere pressure and at a temperature of from 900–1000° F. for 1 hour.

A tungsten disulfide catalyst supported on alumina was prepared by dissolving tungstic acid ($H_2WO_4$) in a 50:50 mixture of ethanol amine and water and impregnating 1/8 inch gamma alumina pills with this solution by soaking for 2 hours. After the excess solution was filtered off, the pills were dried at 250° F. overnight, then at 300° F. for 2 hours, and finally at 1000° F. for 12 hours in a hydrogen sulfide-hydrogen atmosphere containing 5 volume percent hydrogen sulfide. This catalyst contained 0.85 weight percent sulfur.

A tungsten trioxide catalyst supported on alumina was prepared by regenerating the tungsten disulfide catalyst described immediately above, after use in a hydrocracking reaction, with air at a temperature of 1000° F. for 10 hours.

The effectiveness of each of these catalysts is summarized in the table below.

| Catalysts | $WO_3 \cdot Al_2O_3$ | $WS_2 \cdot Al_2O_3$ | $K_2O \cdot WS_2 \cdot Al_2O_3$ |
|---|---|---|---|
| Wt. percent W | 8.32 | 8.32 | 9.68 |
| Wt. percent K | 0 | 0 | 0.58 |
| Conversion of 850 F.+ | 59.6 | 75.9 | 82.4 |
| Percent Desulfurization | 58.2 | 62.6 | 72.5 |
| Coke—wt. percent of Charge | 0.8 | 1.4 | 1.0 |
| Liquid Product—API 60 F. | 29.4 | 30.9 | 33.0 |
| Percent Carbon Residue | 2.6 | 1.7 | 1.1 |

The conversion of 850° F. material obtained using the tungsten disulfide catalyst was considerably greater than was obtained using the tungsten trioxide catalyst and the conversion obtained with the potassium oxide-tungsten disulfide catalyst of this invention was also greater than that obtained with the tungsten disulfide catalyst. Also, the desulfurization effected with the potassium oxide-tungsten disulfide catalyst of this invention was greater than the desulfurization obtained with either the tungsten disulfide or the tungsten trioxide catalysts.

Reasonable variation and modification are possible within the scope of the foregoing disclosure and the appended claims to the invention, the essence of which is that there have been provided a method for activating a tungsten catalyst to form a high proportion of tungsten disulfide in said catalyst, a method of preparing a tungsten trioxide-potassium oxide catalyst supported on alumina, a tungsten disulfide-potassium oxide catalyst composition, and an improved method of hydrocracking, including hydrogenating, hydrocarbons using said activated catalyst.

I claim:

1. A catalyst comprising the oxides of tungsten and potassium deposited on porous active alumina activated by treatment with a sulfur-containing hydrogen stream at an elevated temperature.

2. A catalyst of the composition of claim 1 wherein the range of tungsten oxide is 5 to 15% by weight of the catalyst calculated as a metal, the range of potassium oxide is 0.5 to 2.0% by weight of the catalyst calculated as a metal, and the balance is gamma alumina.

3. A catalyst of the composition of claim 2 activated by treatment with a sulfur-containing hydrogen stream at an elevated temperature in the range of 900–1000° F.

4. A process for activating a hydrocracking catalyst comprising tungsten trioxide deposited on a support which comprises incorporating potassium oxide in intimate association with said catalyst and heating said catalyst containing potassium oxide in a sulfur-containing hydrogen ambient at an elevated temperature for a time so as to convert at least a portion of said tungsten trioxide to tungsten disulfide.

5. The activation process of claim 4 wherein said support is alumina, the range of said potassium oxide is 0.5 to 2.0% by weight of the catalyst calculated as the metal, and the range of said tungsten trioxide is 5 to 15% by weight of the catalyst calculated as the metal.

6. The activation process of claim 4 wherein said sulfur-containing hydrogen ambient is a hydrogen sulfide-hydrogen mixture.

7. The activation process of claim 4 wherein said sulfur-containing hydrogen ambient is a sulfur-containing hydrocrackable hydrocarbon.

8. The activation process of claim 4 wherein said sulfur-containing hydrogen ambient contains sulfur in the range of 2 to 20% by volume calculated as hydrogen sulfide.

9. The activation process of claim 4 wherein said elevated temperature is in the range of 700–1000° F.

10. The process for activating a hydrocracking catalyst consisting essentially of tungsten trioxide in the range of 5 to 15% by weight of the catalyst calculated as a metal, potassium oxide in the range of 0.5 to 2.0% by weight of a catalyst calculated as a metal, and the balance gamma alumina which comprises heating said catalyst in an atmosphere of hydrogen sulfide and hydrogen containing 5% hydrogen sulfide by volume at a temperature in the range of 900–1000° F. for one hour so as to convert at least a portion of said tungsten trioxide to tungsten disulfide.

11. A process for preparing a catalyst comprising impregnating a porous active alumina support with an aqueous solution of tungsten and potassium compounds convertible to oxide form by calcination, so as to deposit in the support an amount of said tungsten compound calculated as a metal in the range of 5 to 15% by weight of the catalyst and said potassium compound calculated as a metal in the range of 0.5 to 2.0% by weight of the catalyst; drying the support and calcining the same so as to convert the metal compounds to the oxides; and heating the resulting metal oxide composite in a sulfur-containing hydrogen ambient at an elevated temperature.

12. The process of claim 11 wherein said sulfur-containing hydrogen ambient is a hydrogen sulfide-hydrogen mixture.

13. The process of claim 11 wherein said sulfur-containing hydrogen ambient is a sulfur-containing hydrocrackable hydrocarbon.

14. The process of claim 11 wherein said elevated temperature is in the range of 700–1000° F.

15. A process for hydrocracking fluid hydrocarbons to more valuable hydrocarbons which comprises contacting a fluid hydrocarbon feed under hydrocracking conditions with a catalyst comprising the oxides of tungsten and potassium deposited on porous active alumina activated by treatment with a sulfiding gas at an elevated temperature.

16. A process for hydrocracking a gas oil boiling in the range of 350–1100° F. which comprises contacting said gas oil under hydrocracking conditions with a catalyst comprising the oxides of tungsten and potassium deposited on porous active alumina activated by treatment with a sulfiding gas at an elevated temperature.

17. The process of claim 16 wherein said catalyst contains tungsten trioxide in the range of 5 to 15% by weight of the catalyst calculated as the metal, potassium oxide in the range of 0.5 to 2.0% by weight of the catalyst calculated as the metal, and the balance alumina.

18. The process of claim 17 wherein said hydrocracking conditions include a temperature in the range of 750–875° F., a pressure in the range of 500–5000 p.s.i.g., a space velocity in the range of 0.5 to 5.0 LHSV, and a hydrogen flow of 500–10,000 cubic feet per barrel of reactants.

19. A process for preparing a catalyst comprising impregnating a porous active alumina support with tungsten and potassium compounds, calcining the resulting impregnated alumina support so as to deposit in said support an amount of said tungsten compound calculated as a metal in the range of 5 to 15 percent by weight of the resulting calcined impregnated support and said potassium compound calculated as a metal in the range of 0.5 to 2.0 percent by weight of the resulting calcined impregnated support, and heating said calcined impregnated support in a sulfur-containing hydrogen ambient at an elevated temperature.

20. A catalyst prepared according to claim 19.

21. A process for hydrocracking fluid hydrocarbons to more valuable hydrocarbons which comprises contacting a fluid hydrocarbon feed under hydrocracking conditions with a catalyst comprising a calcined porous active alumina support impregnated with tungsten and potassium compounds and activated by treatment with a sulfiding gas at elevated temperature.

References Cited in the file of this patent

UNITED STATES PATENTS

| | | |
|---|---|---|
| 1,963,385 | Russell | June 19, 1934 |
| 2,115,336 | Krauch et al. | Apr. 26, 1938 |
| 2,145,657 | Ipatieff et al. | Jan. 31, 1939 |
| 2,184,235 | Groll et al. | Dec. 19, 1939 |
| 2,605,235 | Pitzer | July 29, 1952 |
| 2,691,647 | Field et al. | Oct. 12, 1954 |
| 2,779,711 | Goretta | Jan. 29, 1957 |